United States Patent
Otake

(10) Patent No.: US 8,200,388 B2
(45) Date of Patent: Jun. 12, 2012

(54) HYBRID VEHICLE

(75) Inventor: Shinichi Otake, Nukata-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 344 days.

(21) Appl. No.: 12/451,780

(22) PCT Filed: Jun. 27, 2008

(86) PCT No.: PCT/JP2008/062124
§ 371 (c)(1),
(2), (4) Date: Nov. 30, 2009

(87) PCT Pub. No.: WO2009/013989
PCT Pub. Date: Jan. 29, 2009

(65) Prior Publication Data
US 2010/0168944 A1 Jul. 1, 2010

(30) Foreign Application Priority Data

Jul. 20, 2007 (JP) ................................. 2007-190066

(51) Int. Cl.
*B60W 40/10* (2012.01)
(52) U.S. Cl. ............................ 701/32.5; 701/22; 903/904
(58) Field of Classification Search .................... 701/22, 701/32.5; 903/904; *B60W 40/10*
See application file for complete search history.

(56) References Cited

U.S. PATENT DOCUMENTS

| | | | |
|---|---|---|---|
| 5,670,830 A | 9/1997 | Koga et al. | |
| 2004/0100369 A1 | 5/2004 | Motose et al. | |
| 2008/0042821 A1* | 2/2008 | Kaya | 340/459 |
| 2008/0234888 A1* | 9/2008 | Zanardelli et al. | 701/33 |
| 2009/0322503 A1 | 12/2009 | Suzuki et al. | |
| 2010/0057280 A1* | 3/2010 | Crowe et al. | 701/22 |
| 2010/0057281 A1* | 3/2010 | Lawyer et al. | 701/22 |
| 2011/0010030 A1* | 1/2011 | Yamamoto | 701/22 |

FOREIGN PATENT DOCUMENTS

| | | |
|---|---|---|
| JP | Y2-63-001212 | 1/1988 |
| JP | A-08-019114 | 1/1996 |
| JP | Y2-63-001211 | 1/1998 |
| JP | A-10-304512 | 11/1998 |
| JP | A-11-208313 | 8/1999 |
| JP | A-2001-231109 | 8/2001 |
| JP | A-2002-274219 | 9/2002 |
| JP | A-2004-150396 | 5/2004 |
| JP | A-2005-035413 | 2/2005 |
| JP | A-2006-290182 | 10/2006 |
| JP | A-2007-125921 | 5/2007 |
| WO | WO 2006/124130 A1 | 11/2006 |
| WO | WO 2008/038494 A1 | 3/2008 |

OTHER PUBLICATIONS

Jun. 10, 2011 Search Report issued in corresponding European Application No. 08777862.7.
International Search Report issued in International Application No. PCT/JP2008/062124 on Oct. 14, 2008.
International Preliminary Report on Patentability issued in International Application No. PCT/JP2008/062124 on Feb. 9, 2010 (with English-language translation).

* cited by examiner

*Primary Examiner* — Mark Hellner
*Assistant Examiner* — Ari M Diacou
(74) *Attorney, Agent, or Firm* — Oliff & Berridge, PLC

(57) ABSTRACT

A control section determines either EV travel or HV travel to control drive of an engine. A ratio calculation section calculates an EV/HV travel ratio, and a display section displays the EV/HV ratio as a percentage. In this way it is possible to easily recognize the EV/HV travel ratio.

21 Claims, 3 Drawing Sheets

HYBRID VEHICLE

TECHNICAL FIELD

The present invention relates to a hybrid vehicle fitted with both a motor and an engine.

BACKGROUND ART

Conventionally, hybrid vehicles fitted with both a motor and an engine are known. With this type of hybrid vehicle, since it is possible to charge a battery using power generated by driving an electric generator using the engine, it becomes possible to travel a long distance with a small battery. Also, since the engine can be driven with a steady load, it is possible to suppress discharge of toxic substances, and fuel consumption is improved. Also, in the case where engine drive is more efficient, such as when running at a constant speed, it is possible to travel under the driving power of the engine.

Here, besides HV mode travel for traveling as a normal hybrid vehicle, such as described above, there are also hybrid vehicles having an EV mode for traveling as an electric vehicle that is driven by a motor only with the engine stopped (refer to patent publication 1). In the case of this type of hybrid vehicle, in order to give sufficient travel in EV mode the battery is made comparatively large, and it is also made possible to charge from an external power source such as a commercial power supply.

With this type of hybrid vehicle, in urban areas etc. it is possible to travel a comparatively long distance as an electric vehicle with the engine stopped, and it is possible to travel as a vehicle that does not generate exhaust gas.

In a hybrid vehicle, it has been proposed to separately detect motor travel and engine travel, and display travel distance under motor drive and travel distance under engine drive as numerical information.

Patent Publication 1: JP 08-19114A
Patent Publication 2: JP 63-1211U

DISCLOSURE OF THE INVENTION

With a hybrid vehicle, such as described above, compared to a normal hybrid vehicle the travel distance in EV mode is long. Accordingly, it can be considered that driver side needs, such as wanting to know information relating to travel distance in EV mode, and the amount of that information, will also increase. However, with information relating to travel distance in EV mode that is numerical information, there is a problem in that the driver may not be able to instantly recognize that information.

The present invention is directed to a hybrid vehicle fitted with both a motor and an engine, and having mode control means for carrying out control so that the vehicle travels in either mode of an EV mode for traveling using output of the motor with the engine stopped, or an HV mode for appropriately driving the engine in response to running conditions and traveling using output of the motor and the engine, and mode specific travel distance display means for proportionally displaying travel distance in EV mode and travel distance in HV mode.

It is also possible to display a ratio of travel distance in EV mode and a travel distance in HV mode in two different time periods.

It is also possible for the two different time periods to be periods in which the same route is travelled, and for the two periods to not overlap with each other.

It is also possible for the two different time periods to be periods of the same length, and for the two periods to not overlap with each other.

It is also possible for the two different time periods to be periods of different length, and to include a period where the two periods overlap with each other.

It is also possible to be able to charge a battery for supplying power to the motor from an eternal power source, and to display a charging fee or a charging power amount for the two different time periods.

In this way, according to the present invention, a ratio of travel distance in EV mode and travel distance in HV mode is displayed. It is therefore possible for a user to easily recognize an EV/HV travel ratio.

BEST MODE OF CARRYING OUT THE INVENTION

Embodiments of the present invention will be described in the following based on the drawings.

Figure 1:
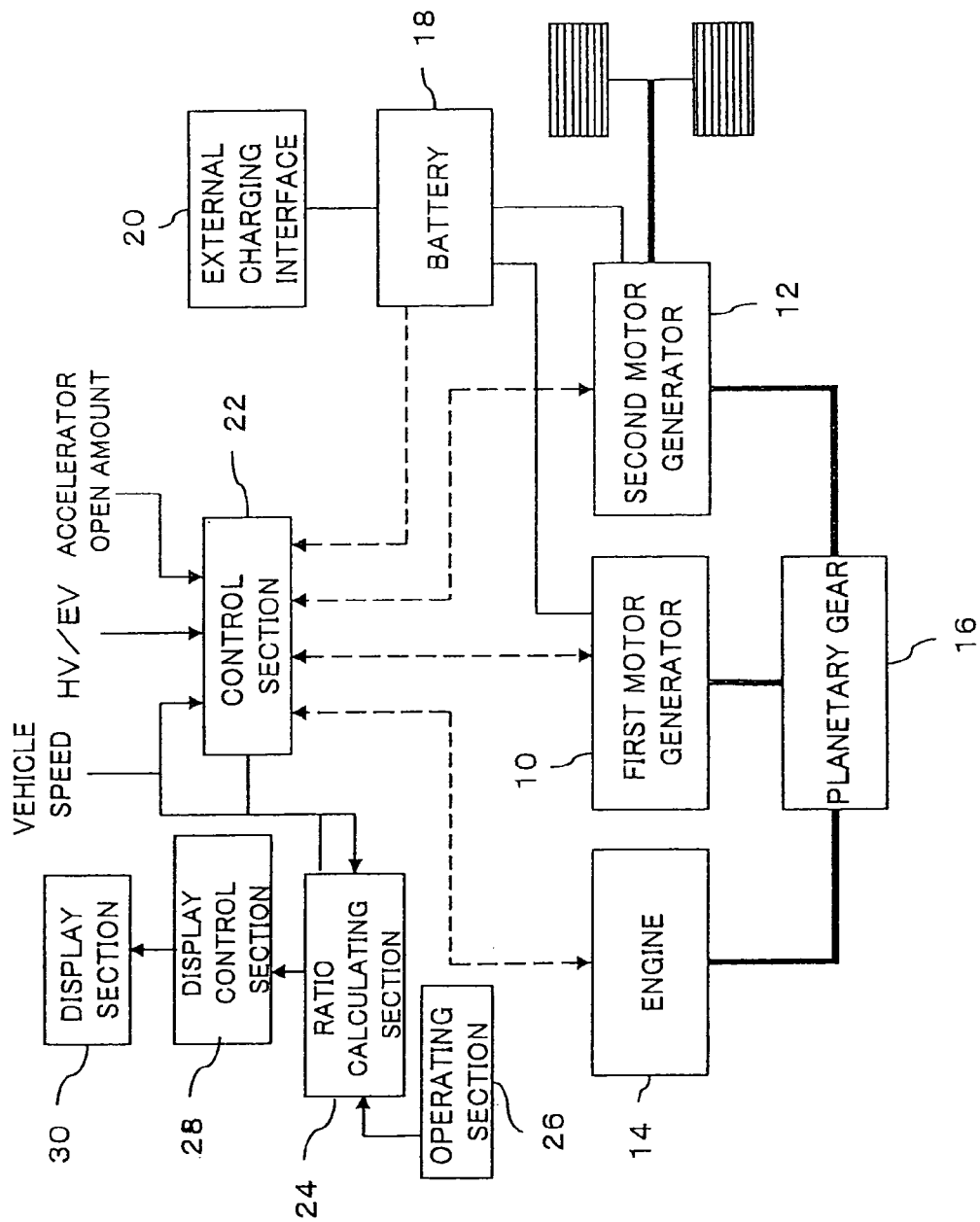
FIG. 1 is a diagram showing the schematic structure of a hybrid vehicle of an embodiment.

FIG. 1 is a block diagram showing the schematic structure of essential parts of a hybrid vehicle of the present invention. Here, this hybrid vehicle is a vehicle fitted with a motor and an engine, and has an EV mode for traveling using output of the motor with the engine stopped, and an HV mode for appropriately driving the engine according to travel conditions and traveling using output of the motor and the engine.

A planetary gear mechanism 16 is connected to a first motor generator 10, a second motor generator 12 and an output shaft of an engine 14. This planetary gear mechanism 16 transmits two output torques of the second motor generator 12 and the engine 14 to drive wheels, to cause the vehicle to travel, and also generates electricity using the first motor generator 10. For example, the first motor generator 10 is connected to a sun gear of the planetary gear mechanism 16, the engine 14 is connected to a carrier, and the second motor generator 12 is connected to a ring gear, and drive force of the second motor generator 12 or drive force of the engine 14 is transmitted to a drive system by means of the planetary gear mechanism 16. Also, electricity is generated by the first motor generator 10 using the drive force of the engine 14. Also, electricity generation by regenerative braking is carried out in the second motor generator 12. The HV structure is not limited to this series parallel type, and any structure can be appropriately adopted regardless of the structure of the hybrid vehicle, as long as it is a hybrid vehicle having an engine and a motor and being capable of travel with only output of the motor with the engine stopped.

Also, a battery 18 is connected to the first and second motor generators 10 and 12, and drive is performed using electric power of the battery 18, and the battery 18 is charged using generated electric power.

Here, with EV mode, travel is carried out as a result of the second motor generator 12 being driven using electrical power of the battery 18, and regenerative braking is also carried out.

An external charge interface 20 is connected to the battery 18. This external charge interface 20 has a built-in rectifier, and is capable of connection to an external power supply, and charges the battery 18 using electrical power from the external power supply. The external power supply is a normal commercial power supply of AC 100V or AC 200V, but it is also possible to be a power supply that uses a generator or the like.

Also, this hybrid vehicle has a control section 22, and this control section 22 is switched between HV mode and EV mode, and controls the engine 14 and the first and second motor generators 10 and 12 in each mode. A HV/EV signal for determining HV mode or EV mode is determined by a button operation by the driver or the like. This control section 22 functions as mode control means.

HV/EV Mode

First, in HV mode the control section 22 determines whether to travel using motor drive or to travel using engine drive from information such as vehicle speed and accelerator open amount that is input, and in the case of motor drive, travel is performed by driving vehicle wheels using the second motor generator 12, while in the case of engine drive, travel is performed by driving vehicle wheels using the engine 14. In particular, travel is performed using engine drive at the time of steady speed travel or at the time of high-speed travel, and by driving the second motor generator 12 at the time of starting or at the time of low speed travel etc.

Also, information on state of charge (SOC) of the battery 18 is also supplied to the control section 22, and when the battery SOC is smaller than a predetermined value (for example, 40%), the engine 14 is driven and power generation is carried out by the first motor generator 10 using drive force of the engine 14, and the battery 18 is charged until the SOC reaches a specified value (for example, 60%).

In EV mode, drive of the engine 14 is prohibited in the control section 22. Specifically, except in cases such as where the required drive force can not be generated by the motor alone, or battery SOC drops below a value at which it is considered that battery degradation may occur, travel is basically performed by driving the second motor generator 12 using electrical power of the battery 18. In this EV travel, charging of the battery 18 is also carried out using regenerative braking, but basically the SOC of the battery 18 is reduced with travel.

It is therefore preferable to fully charge the battery 18 in advance when traveling in EV mode. With this hybrid vehicle, there is the external charge interface 20, and charging is carried out by connecting an external power supply to this external charge interface 20. For example, it is possible to connect the external power supply to the external charge interface by connecting a cable to the external charge interface 20 by means of a connector, and inserting a plug provided on the other end of this cable into a commercial power supply, and the battery 18 is then charged using direct current after rectification. When the battery 18 has been sufficiently charged, this is detected by the external charge interface 20, and charging stops. The cable is then removed and travel can take place in EV mode.

Travel in EV mode normally has a lower limit at about 20% of the SOC of the battery 18. Therefore, if the SOC of the battery 18 reaches 20% at the time of traveling in EV mode the control section 22 drives the engine 14 and transfers to HV mode. At this time, it is preferable to issue a warning (for example a display) of the mode change to the user. If the SOC reaches 25%, it is preferable to issue a warning and switch to HV travel, or to issue a warning that recharging is necessary.

With hybrid vehicles the capacity of the battery 18 is comparatively large, and it is possible to make an EV travel distance long compared to a conventional hybrid vehicle. Consequently a variety of ratios appear as an EV/HV travel ratio, and there has been growing demand from users to be able to recognize this.

Display

A ratio calculating section 24 is connected to the control section 22. Vehicle speed is also supplied to this ratio calculating section 24. This vehicle speed is normally supplied as vehicle speed pulses, but these vehicle speed pulses are processed for vehicle speed display and travel distance display. It is therefore possible to receive data after processing.

This ratio calculating section 24 then calculates travel distance in EV mode and travel distance in HV mode, and calculates an EV/HV travel ratio, which is a ratio of these two distances. An operating section 26 is connected to the ratio calculating section 24, and what time period a ratio is calculated for is set by operation of this operating section 26.

The obtained EV/HV travel ratio is then supplied to the display section 30 via the display control section 28, and displayed on the display section 30. The operating section 26 is preferably a touch panel that uses the display section 30. The ratio calculating section 24, display control section 28 and display section 30 also function as separate travel distance display means.

Figure 2:
FIG. 2 is a drawing showing a display example for EV/HV travel ratio.

One example of display is shown in FIG. 2. In this way, with this embodiment a ratio of the travel distance in EV mode and the travel distance in HV mode is displayed as a ratio of lengths within a bar in the horizontal direction. With this example, the oblique lined section on the left represents EV travel while the blank section on the right represents HV travel. As a result of this display, a user can easily understand the ratio of travel in EV mode to travel in HV mode at a glance. For example, it is preferable to display the EV travel part as green and the HV travel part as red or white. It is also possible for the user to be able to perform setting of the colors. For example, it is possible to have an arrangement where by touching the appropriate section a color change button is displayed, and the color is changed by operating that button.

With this embodiment, the HV mode is defined as a mode for appropriately driving an engine. However, this is not limiting, and it is also possible to recognize HV mode as only when the engine is being driven, and all other times as EV mode. It is also possible to make it possible to change the definition of HV mode by touching a display bar and displaying a menu. When HV is recognized only at the time of engine drive, the control section 22 supplies information about sections where the engine is being driven to the ratio calculating section 24.

Also, FIG. 2 shows a ratio for calculated travel distances from initial turning on of the ignition to operation of a reset button of the operating section 26, namely to the current time. After that, the EV travel distance and the HV travel distance are reset using the reset button, each of the travel distances after that are calculated by the ratio calculating section 24, and display is carried out. Specifically, unless the user operates the reset button, even if the ignition is on a cumulative value for travel distance is stored and held, and display of travel ratio for a continuing period is carried out.

Figure 3:
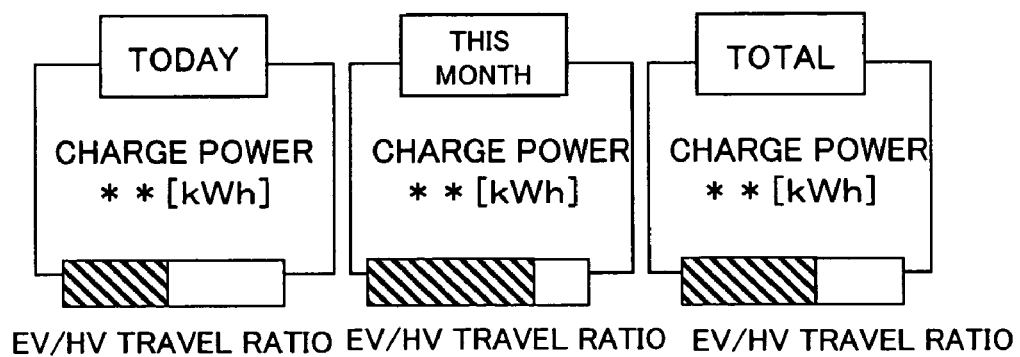
FIG. 3 is a drawing showing another example of display of EV/HV travel ratio.

FIG. 3 is another example, and with this example three EV/HV travel ratios are displayed. The one on the extreme left is travel ratio for today. Time information is supplied to the ratio calculating section 24 from a clock, travel distance in each mode for today is calculated, and the EV/HV travel ratio is displayed. Also, the middle drawings is travel ratio for this month. A cumulative result from the start of the month is displayed. The drawing on the right is an EV/HV travel ratio for total travel by this hybrid vehicle up to today. This total travel ratio can be reset when the owner of the vehicle changes.

A cumulative period for travel distance in each mode can also be made a specified single trip. This single trip can be a period from launching the system until terminating the system, or can be from point of departure to destination for a trip where destination has been set in a navigation system. It can also be a period from completion of charging to the current time, or a distance that can be travelled with a single charge, or the like.

In this manner, with the example of FIG. 3 it is possible to display an EV/HV travel ratio for a plurality of periods, and so it becomes possible to compare EV travel percentages for different periods.

Here, in FIG. 3, not only are EV/HV ratios for three periods shown, but charged power is also combined and displayed. This charge power is a charge power amount from the external power supply, and in the external charge interface 20 charge power is detected and the result of detection is displayed. It is also possible to display not charge power amount (in kWh) but the charge power fee (in monetary units). Using this display a user can also take into consideration the charge power fee, and draw up a plan for use of EV/HV mode from this information.

Figure 4:
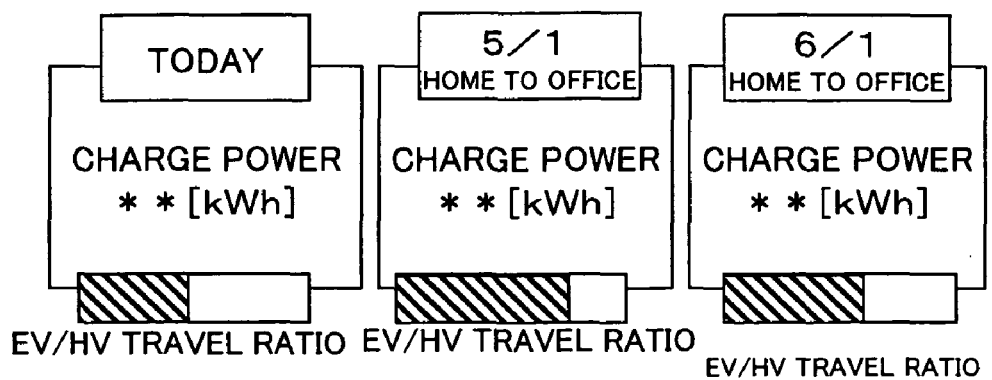
FIG. 4 is a drawing showing yet another example of display of EV/HV travel ratio.

FIG. 4 shows yet another example. With this example, as well as travel for today, EV/HV travel ratios for travel from home to the office for May $1^{st}$ and for the same section, that is travel from the home to the office, on June $1^{st}$, are displayed. By displaying EV/HV travel ratios for two different times for the same section in this way, it is possible to compare two actual drives at the same scale. As a result, the driving technique of the user themselves is improved, that is, it is possible for the user to discern themselves that they became able to travel making the most efficient use of electrical power.

Figure 5:
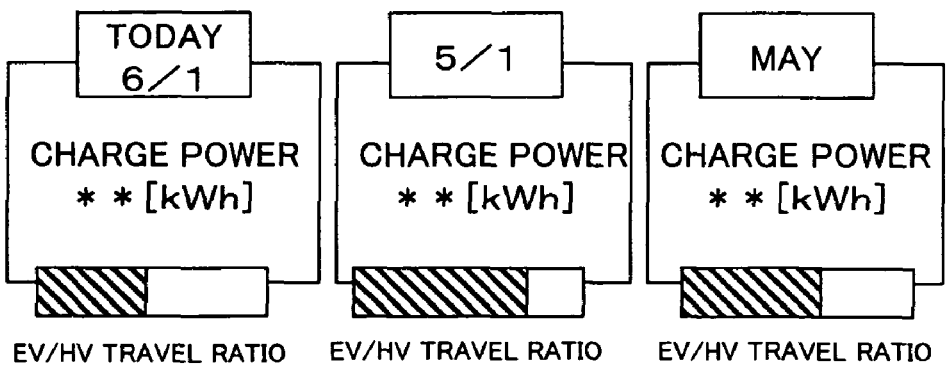
FIG. 5 is a drawing showing a still further example of display of EV/HV travel ratio.

A still further example is shown in FIG. 5. With this example, cumulative travel for June $1^{st}$, which is today, cumulative travel for May $1^{st}$, which is a specified single day, and cumulative travel for the month of May are displayed. In this way cumulative travel for May $1^{st}$ is part of cumulative travel for the month of May, and the two are different in scale, while cumulative travel for May 1st constitutes part of the cumulative travel for the month of May. In this way, it is possible to recognize what type of effect travel for a specified single day has on cumulative travel for a month.

It is also possible to display cumulative travel for periods that partially overlap, such as cumulative travel for April to July, and cumulative travel for June to September.

Also, three types of display are displayed simultaneously on the display section 30 in FIG. 3 to FIG. 5, but it is also possible to switch display in response to operation of the operating section 26.

The invention claimed is:

1. A hybrid vehicle having both a motor and an engine, the hybrid vehicle comprising
mode control means for performing control so as to carry out an EV mode for traveling using output of the motor with the engine stopped, and an HV mode for traveling using output of the motor and the engine; and
mode specific travel distance display means for displaying travel distance in the EV mode and travel distance in the HV mode as percentages.

2. The hybrid vehicle of claim 1, wherein:
the mode specific travel distance display means displays percentages for travel distance in the EV mode and travel distance in the HV mode in two different time periods.

3. The hybrid vehicle of claim 2, wherein:
the two different time periods are periods in which the same route is travelled, and the two periods do not overlap with each other.

4. The hybrid vehicle of claim 2, wherein:
the two different time periods are periods of the same length, and the two periods do not overlap with each other.

5. The hybrid vehicle of claim 2, wherein:
the two different time periods are periods of different length, and include a period where the two periods overlap with each other.

6. The hybrid vehicle of claim 2, wherein
it is possible to charge a battery for supplying power to the motor from an external power source, and the mode specific travel distance display means displays a charging fee or a charging power amount for the two different time periods.

7. The hybrid vehicle of claim 3, wherein
it is possible to charge a battery for supplying power to the motor from an external power source, and the mode specific travel distance display means displays a charging fee or a charging power amount for the two different time periods.

8. The hybrid vehicle of claim 4, wherein
it is possible to charge a battery for supplying power to the motor from an external power source, and the mode specific travel distance display means displays a charging fee or a charging power amount for the two different time periods.

9. The hybrid vehicle of claim 5, wherein
it is possible to charge a battery for supplying power to the motor from an external power source, and the mode specific travel distance display means displays a charging fee or a charging power amount for the two different time periods.

10. A hybrid vehicle having both a motor and an engine, the hybrid vehicle comprising
a mode controller that controls the hybrid vehicle so as operate in an EV mode in which the vehicle travels using output of the motor with the engine stopped, and in an HV mode in which the vehicle travels using output of the motor and the engine; and
a mode specific travel distance display that displays travel distance in the EV mode and travel distance in the HV mode as percentages.

11. The hybrid vehicle of claim 10, wherein:
the mode specific travel distance display displays percentages for travel distance in the EV mode and travel distance in the HV mode in two different time periods.

12. The hybrid vehicle of claim 11, wherein:
the two different time periods are periods in which the same route is travelled, and the two periods do not overlap with each other.

13. The hybrid vehicle of claim 11, wherein:
the two different time periods are periods of the same length, and the two periods do not overlap with each other.

14. The hybrid vehicle of claim 11, wherein:
the two different time periods are periods of different length, and include a period where the two periods overlap with each other.

15. The hybrid vehicle of claim 11, wherein
it is possible to charge a battery for supplying power to the motor from an external power source, and the mode specific travel distance display displays a charging fee or a charging power amount for the two different time periods.

16. A hybrid vehicle having both a motor and an engine, the hybrid vehicle comprising
a mode controller that controls the hybrid vehicle so as operate in an EV mode in which the vehicle travels using output of the motor with the engine stopped, and in an HV mode in which the vehicle travels using output of the motor and the engine; and
a mode specific travel distance display that displays a ratio of travel distance in the EV mode to travel distance in the HV mode.

17. The hybrid vehicle of claim 16, wherein:
the mode specific travel distance display displays ratios of travel distance in the EV mode and travel distance in the HV mode in two different time periods.

18. The hybrid vehicle of claim 17, wherein:
the two different time periods are periods in which the same route is travelled, and the two periods do not overlap with each other.

19. The hybrid vehicle of claim 17, wherein:
the two different time periods are periods of the same length, and the two periods do not overlap with each other.

20. The hybrid vehicle of claim 17, wherein:
the two different time periods are periods of different length, and include a period where the two periods overlap with each other.

21. The hybrid vehicle of claim 17, wherein
it is possible to charge a battery for supplying power to the motor from an external power source, and the mode specific travel distance display displays a charging fee or a charging power amount for the two different time periods.

* * * * *